Feb. 2, 1943.  R. W. BYERLY  2,309,930
METHOD AND APPARATUS FOR GRAPHICAL COMPUTATION FOR THE SOLUTION
OF NAVIGATION PROBLEMS AND SIMILAR PROBLEMS
Filed June 27, 1941  3 Sheets-Sheet 1
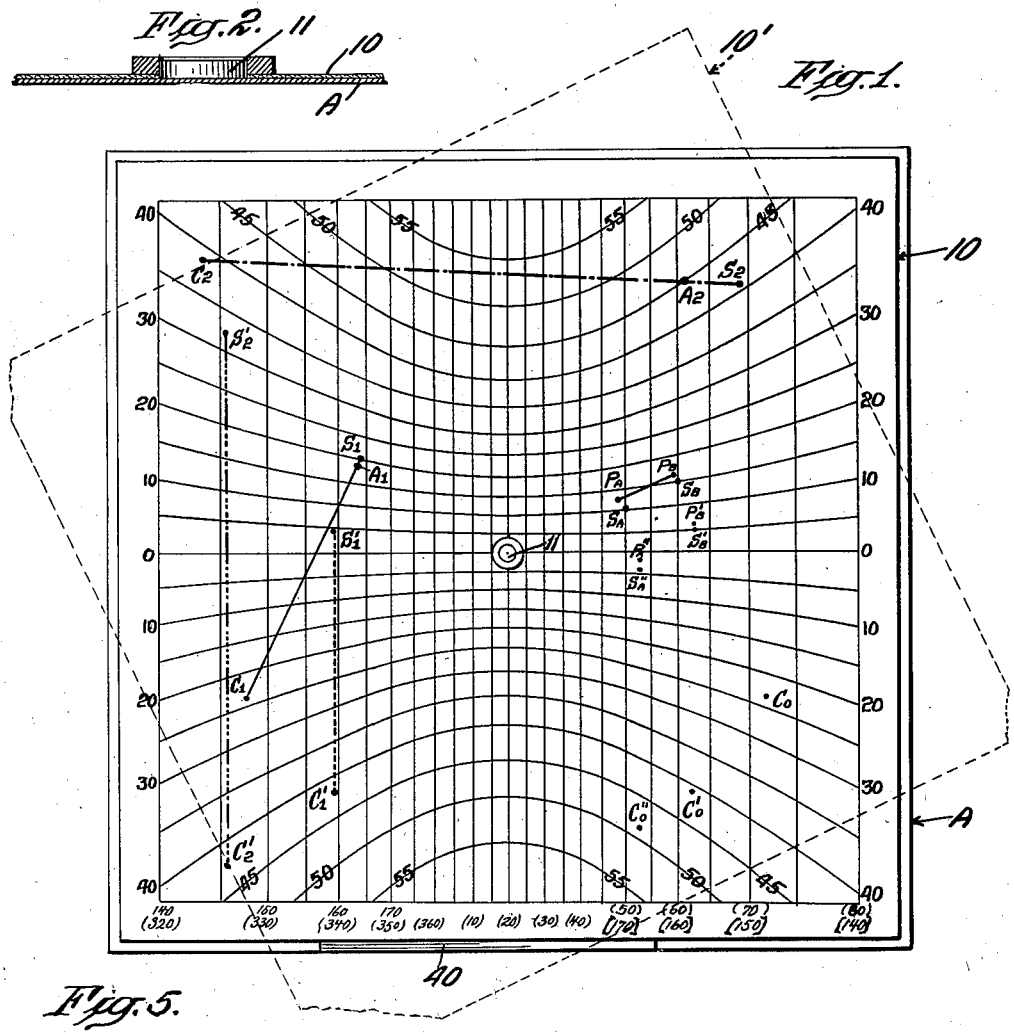
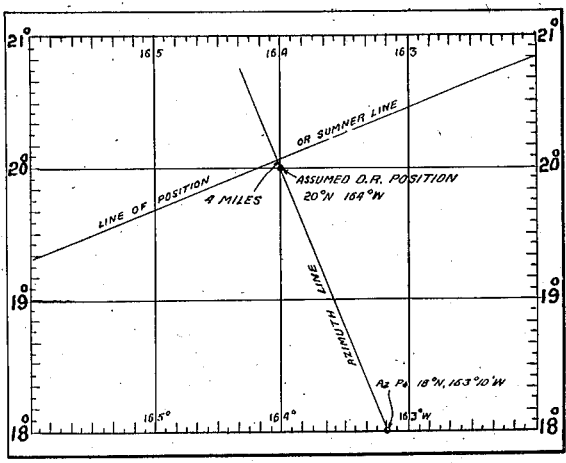
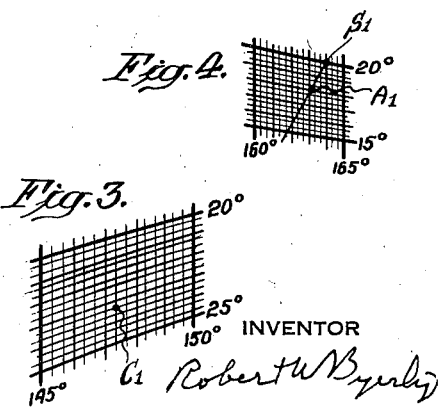
INVENTOR
Robert W Byerly Feb. 2, 1943.     R. W. BYERLY     2,309,930
METHOD AND APPARATUS FOR GRAPHICAL COMPUTATION FOR THE SOLUTION
OF NAVIGATION PROBLEMS AND SIMILAR PROBLEMS
Filed June 27, 1941     3 Sheets-Sheet 2

INVENTOR
Robert W. Byerly

Feb. 2, 1943.  R. W. BYERLY  2,309,930
METHOD AND APPARATUS FOR GRAPHICAL COMPUTATION FOR THE SOLUTION
OF NAVIGATION PROBLEMS AND SIMILAR PROBLEMS
Filed June 27, 1941   3 Sheets-Sheet 3
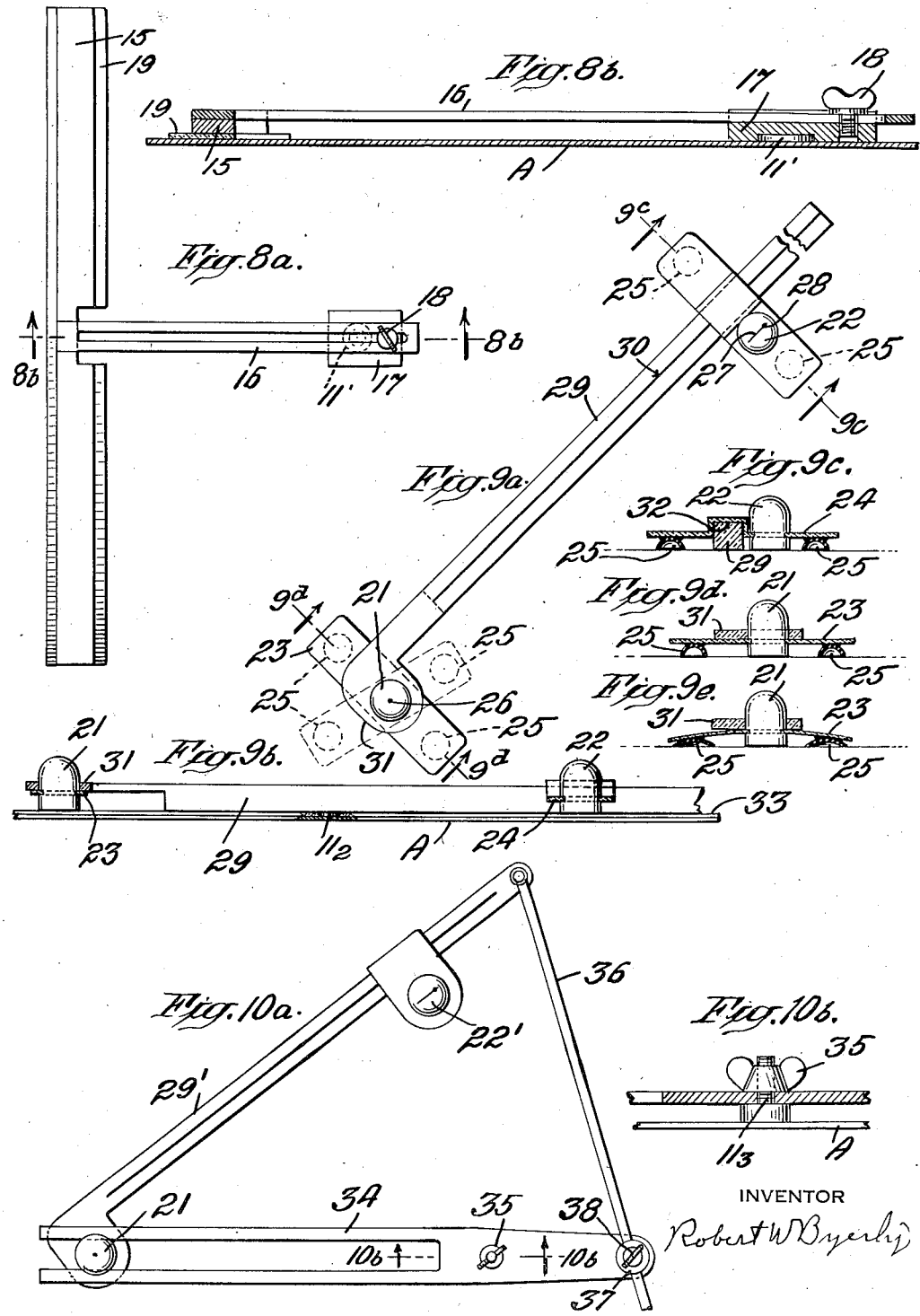
INVENTOR
Robert W. Byerly Patented Feb. 2, 1943

2,309,930

UNITED STATES PATENT OFFICE 2,309,930

METHOD AND APPARATUS FOR GRAPHICAL COMPUTATION FOR THE SOLUTION OF NAVIGATION PROBLEMS AND SIMILAR PROBLEMS

Robert W. Byerly, New York, N. Y.

Application June 27, 1941, Serial No. 400,082

22 Claims. (Cl. 33—1)

This invention relates to method and apparatus for graphical computation for the solution of navigation problems and similar problems.

The mathematical problem presented in modern methods of navigation is to ascertain from a time sight the data required for plotting a line of position. This is usually done by computing the altitude and azimuth which the celestial body would have had if it had been observed from an assumed or dead-reckoning position, and then comparing the computed altitude with the observed altitude to ascertain the offset of the line of position from the dead-reckoning position. The computation involves the solution of two spherical triangles and requires the use of tables of logarithms of trigometric functions.

The method of the present invention solves the navigation problem without solving any spherical triangles and without the use of mathematical tables. The position of the celestial body and the assumed or dead-reckoning position of the ship are plotted on a gnomonic projection of the parallels and meridians of a sphere. The plotted points are then swung about the contact point of the projection without changing the distance between them until the two points lie on a common meridian of the projection. When the points have been placed on a common meridian, the latitude of each point is read from the parallels of the projection. The algebraic difference between the two readings gives the great-circle distance between the points as originally plotted, which is the zenith distance of the celestial body at the dead-reckoning position. By comparing this graphically calculated zenith distance with the observed zenith distance (that is with the complement of the observed altitude) the offset of the line of position from the dead-reckoning position is immediately obtained.

In this method, computation of the azimuth of the celestial body may be replaced by observing the position of the line connecting the two plotted points before the points are swung to measure the zenith distance, or the direction of the line of position may be determined directly by obtaining two points on it. All the data required for plotting a line of position are thus ascertained easily and quickly and without the use of tables.

Apparatus embodying the invention consists essentially of a chart bearing gnomonic projection of the parallels and meridians of a sphere and a point-marking element overlying the chart and pivoted to the chart at the contact point of the projection.

In order that the invention may be clearly understood, I will describe in detail the specific apparatus embodying it which is shown in the accompanying drawings, and will give a number of specific illustrations of the practice of the method by means of such apparatus. In the drawings:

Fig. 1 is a plan view of the chart bearing gnomonic projection with the contact point at the equator, and a transparent point-marking element overlying the chart and pivoted to it at the contact point of the projection;

Fig. 2 is an enlarged fragmentary, vertical section of the apparatus shown in Fig. 1, the section being taken through the axis of the pivot;

Figs. 3 and 4 are greatly enlarged fragmentary views of parts of the surface of the chart shown in Fig. 1;

Fig. 5 is an ordinary Mercator plotting chart covering latitudes from 18° to 21°;

Figs. 8a and 8b are a plan and a vertical section of a sliding rule type of point-marking elements;

Figs. 9a and 9b are a plan view and a side elevation and Figs. 9c, 9d and 9e transverse sections of a vacuum cup type of point-marking element; and Figs. 10a and 10b are a plan view and a large vertical section of another type of point-marking element.

Figure 6:
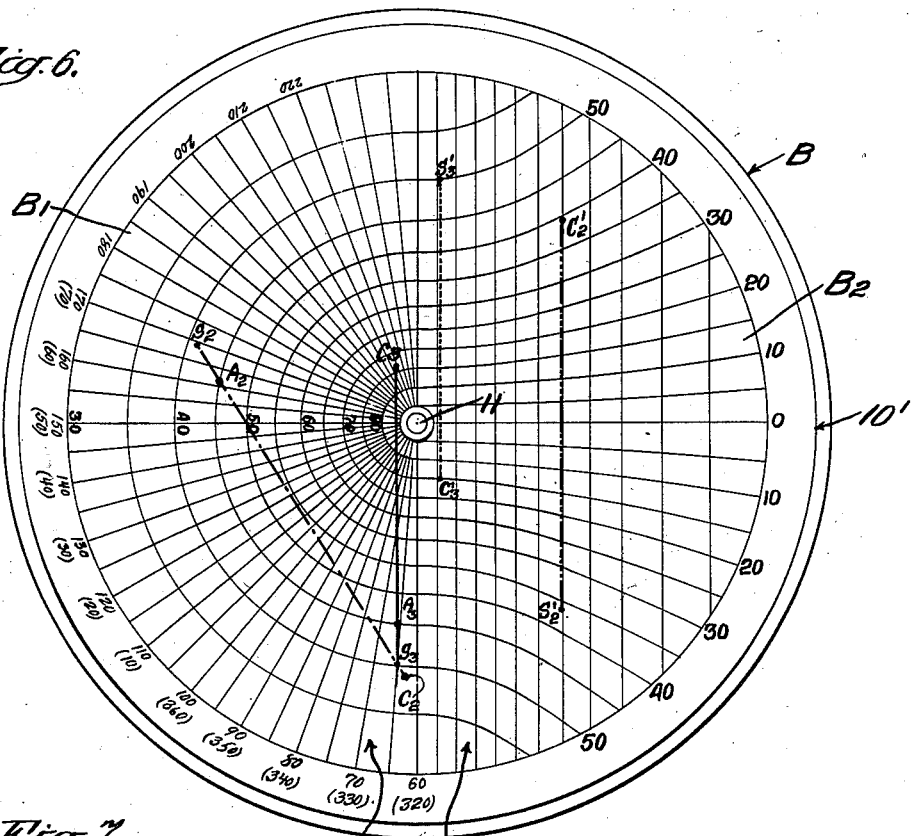
Fig. 6 is a view similar to Fig. 1 showing a chart bearing two gnomonic projections, one of which has its contact point at the equator and the other at a pole.
Figure 7:
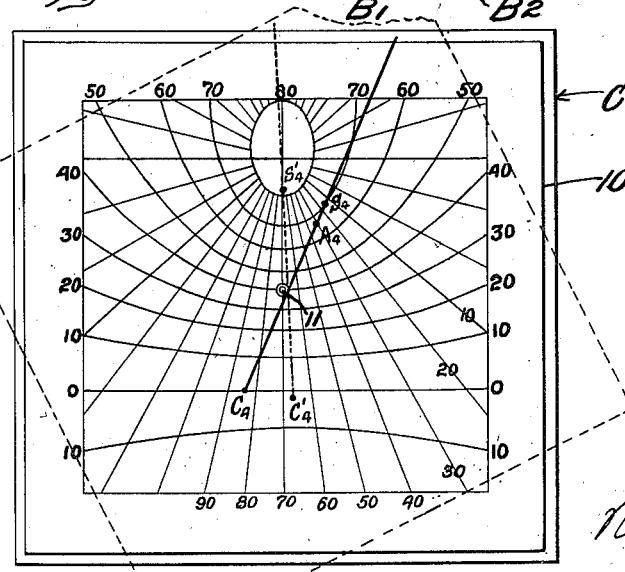
Fig. 7 is a similar view showing a chart bearing the gnomonic projection with its contact point near the fortieth parallel.

The three charts A, B and C shown in Figs. 1, 6 and 7 bear gnomonic or great-circle projections of the parallels and meridians of a sphere. Chart A bears a projection with the contact point at the equator. The projection extends 60° north, south, east and west from the contact point.

Chart B has a plotting half B₁ and a measuring half B₂. The plotting half of the chart bears a gnomonic projection of the parallels and meridians of a sphere with the contact point at a pole. The measuring half bears a gnomonic projection of the meridians and parallels of a sphere of the same radius with the contact point at the equator. The polar projection extends through 180° of longitude and from a latitude of 30° to the pole. The equatorial projection extends from 60° north latitude to 60° south latitude, and through 60° of north latitude at one side of the contact point. The contact points of the projections on the two halves of the chart are coincident and at the center of the chart.

Chart C bears gnomonic projection with the contact point on an intermediate parallel. The contact point of the specific projection shown in Fig. 7 is near the fortieth parallel.

In Figs. 1, 6 and 7, the rulings of the charts are shown at large intervals in order to make the charts clear on the small scale required in patent drawings. Thus, Figs. 1 and 6 show the meridians and parallels at intervals of 5°, while Fig. 7 shows them at intervals of 10°. The actual charts are most desirably ruled at intervals of 10 or 20 minutes of arc. Figs. 3 and 4 show a form of ruling which is convenient on the charts when they are made about 18 inches square. The meridians and parallels are ruled at intervals of 20 minutes of arc.

The charts may be printed on paper, but it is better to print them on sheets of metal or sheets of plastic, which are not irregularly deformed by changes in weather.

The point-marking elements $10$, $10'$, shown in Figs. 1, 2, 6 and 7 are transparent markable sheets, which overlie the charts and are secured to them, either permanently or temporarily, by pivots $11$, located at the contact points of the projections on the charts. The transparent sheet $10$ may consist of tracing paper or tracing cloth, but most desirably consists of a sheet of transparent plastic, such as cellulose acetate, having its upper surface roughened sufficiently to be markable with a pencil. The sheet $10$ should be so thin that there is no appreciable parallax between markings on the upper surface of the sheet and the rulings on the chart under the sheet.

I will now describe specific examples of the method carried out by means of the apparatus which has been described.

*Example I*

The navigator of the U. S. S. Pruitt on 17 December, 1934, in the vicinity of the Hawaiian Islands, in D. R. position, latitude 20°10′ N., longitude 163°33′ W., observed the sun as follows: GCT $21^h45^m26^s$, Hs 43°27′.0, IC (—) 0′30″, Ht. eye 36 feet.

| GCT | $12^h$ | $45^m$ | $26^s$ |       | 90° | 00   |
|-----|--------|--------|--------|-------|-----|------|
| GHA |        | 120°   | 58′.1  | IC    |     | +0.5 |
| Corr.|       | 26°    | 15′    | Corr. |     | —9.5 |
| Corr.|       | 0°     | 6′.5   |       | 89° | 51′  |
| GHA |        | 147°   | 19.6   | Hs    | 43  | 27   |
| Dec.|        |        |        | ZDo   | 46  | 24   |

|        | Cel. body | D. R. | Az. pt. |          |
|--------|-----------|-------|---------|----------|
| GHA    | 147° 20′  | 164°  | 165° 10′ | Long. W. |
| Dec.   | —23° 21′  | +20°  | 18° 0′   | Lat.     |

Measured lat. $+ 3°30$
Measured lat. $-42\ 50$ } Subtract

ZDc 46°20′
ZDo 46°24′

Diff. 4 miles, away

The data above the table is obtained from the Nautical Almanac in the usual manner, except that the altitude and the altitude corrections are subtracted from 90° so as to obtain the corrected observed zenith distance, ZDo. This data may then be arranged in the table as shown above, the dead-reckoning position being taken on whole degrees.

The figures in italics in the table represent the solution of the problem as obtained from chart A in the following manner:

After numbering the meridians of chart A consecutively from 140 to 170 as shown in Fig. 1, the position of the celestial body is plotted and marked by a dot at $C_1$ on the transparent sheet $10$ overlying the chart. The dead-reckoning position is similarly plotted and marked at $S_1$. The latitude and longitude of a point $A_1$ lying on the line $C_1$—$S_1$ near $S_1$ is then read and inserted in the table under "Az. pt."

The transparent sheet $10$ is then swung about the pivot $11$ until the points $C_1$, $S_1$ lie on a common meridian of the chart. This position of the chart and the points is indicated by the dotted lines $10'$ and $C_1'$—$S_1'$ in Fig. 1. There is no difficulty in placing the two points on a common meridian, even though they do not happen to fall on one of the meridians actually drawn on the chart, as in this case it is necessary merely to place them at equal distances from the nearest meridian drawn on the chart.

After the transparent sheet $10$ has been turned to place the points on a common meridian, the latitude of each point is read from the parallels of the chart and inserted in the table after "Measured lat." The algebraic difference between the two measured latitudes, which when they are of different signs amounts to the arithmetic sum of the two latitudes, is then entered in the table after "ZDc" and compared with "ZDo" to ascertain the offset of the Sumner line. As in this example the observed zenith distance is greater than the calculated zenith distance, the offset is away from the celestial body.

The data obtained from chart A and entered in the table is then used to plot a line of position on a plotting chart or navigation chart in the usual manner, except that the direction of the azimuth line is obtained by connecting the assumed dead-reckoning point with the azimuth point, instead of by measuring degrees of azimuth. The plotting of the line of position of Example I is shown in Fig. 5. The plotting on the plotting chart is made easy by selecting the assumed dead-reckoning position on whole degrees of latitude and longitude and selecting an azimuth point on a whole degree of latitude or on a whole degree of longitude.

As the measuring half $B_2$ of chart B is the same as one half of chart A, it is apparent that the above problem could be solved on the half $B_2$ of chart B just as well as upon chart A.

*Example II*

On May 15, 1933, about 7.34 p. m., the U. S. S. Pennsylvania while in D. R. position, latitude 40°43′ N., longitude 60°30′ W., observed the star Vega as follows: W$7^h34^m14^s$, C-W $4^h59^m12^s$, Chronometer slow $1^m01^s.2$. Hs 14°45′40″. Ht. eye 35 feet. IC 0′ 00″.

|       | Cel. body | DR   | Az. pt. |          |
|-------|-----------|------|---------|----------|
| GHA   | 323° 13′  | 69°  | 61  30  | Long. W. |
| Dec.  | +38° 43′  | +41° | 45   0  | Lat.     |

|                    | Chart A  | Chart B  |           |
|--------------------|----------|----------|-----------|
| Measured lat.      | +32 25   | +39°35′  |           |
| Measured lat.      | —43 05   | —35°55′  | Subtract  |
| ZDc                | 75 30    | 75 30    |           |
| ZDo                | 75 24    | 75 24    |           |
|                    | 6        | 6 miles towards |    |

This problem may be solved either by means of chart A or by means of chart B. In solving the problem by chart A, the meridians are numbered from 320° to 70° as shown by the figures in parenthesis in Fig. 1. The points C₂ and S₂ are plotted, the latitude and longitude of the point A₂ is read, the transparent sheet is swung to bring the points of the positions C₂' and S₂' where they lie on a common meridian, and the latitudes are read and added as before.

In solving this problem by means of chart B shown in Fig. 6, substantially the same procedure is used. The meridians of the plotting half B₁ of the chart are numbered from 320 to 70 as shown by the numbers in parenthesis on Fig. 6. The points C₂ and S₂ are plotted on this half of the chart, and the latitude and longitude of the azimuth point are read on this half of the chart. The transparent sheet 10' is then turned about the pivot 11 to bring the points on a common meridian of the measuring half B₁ of the chart as shown at C₂' and S₂'.

In connection with Example II, it will be noted that, while the two measured latitudes on chart A are different from those measured on chart B, the sum of the two latitudes in each case is the same.

*Example III*

Observation on B hrs. min. from D. R. position Lat. 40° N., Long. 65° W.

|  | Cel. body | Ship | Az. pt. |  |
|---|---|---|---|---|
| GHA | 215° 43' | 65° | 66° 10' | Long. W. |
| Dec. | +74° 24 | +40° | 45 0 | Lat. |

Measured lat. +49 50 } Subtract
Measured lat. −14 5 }

ZDc 63 55
ZDo 63 41

Diff. 14 miles toward

This problem is outside the scope of chart A, since the declination of the celestial body is greater than 60°, the highest latitude shown on chart A. It may easily be solved on chart B by numbering the meridians of the plotting half of the chart from 60 to 220 as shown in Fig. 6, and then proceeding as before as indicated by the points C₃, S₃, A₃ and C₃', S₃' shown in Fig. 6.

*Example IV*

Observation on sun at equinox from D. R. position Lat. 70° N., Long. 30° W.

|  | Cel. body | Ship | Az. pt. |  |
|---|---|---|---|---|
| GHA | 84° 0 | 15° | 30° 0° | Long. W. |
| Dec. | −0° 2' | +70° | 67 0° | Lat. |

Measured lat. +81° 0' } Subtract
Measured lat. − 2° 0' }

ZDc 83° 0
ZDo 83 10

Diff. 10 away

The problem is solved on chart C shown in Fig. 7, as indicated by the points C₄, S₄, A₄ and C₄', S₄' in that figure. In using chart C, it may be convenient to extend the line connecting the two plotted points as shown, so that, when the transparent sheet 10 is turned to place the two points on the common meridian, this may be done by simply turning until an extension of the line connecting the two points passes through the pole (see extension of line C₄'—S₄').

From consideration of the above examples, it will be seen that all sights where both the celestial object and the ship are between 40° north latitude and 60° south latitude or between 60° north latitude and 40° south latitude can be worked up on chart A. This includes all sun and planet sights, except where the latitude of the ship is greater than 60°. All sights where the latitude of the ship and the declination of the celestial body are of the same name and both greater than 30° can be worked up on chart B. Chart C is required only when the latitude of the ship is less than 30° or greater than 60° and a low altitude sight is taken in a generally northerly or southerly direction.

For the navigation of aircraft, in which it is not customary to use very low altitude sights, chart B alone will usually be found sufficient, as the half B₂ of this chart may be used not only for measuring distances plotted on the half B₁, but also as a plotting and measuring chart for other problems which might be solved on chart A.

The numbering of the meridians, which is the first step in using any one of the charts, may be in either direction. It is necessary only that the meridians be numbered consecutively so as to bring both the celestial body's meridian and the ship's meridian on the chart. In using chart A, the best results will be obtained by numbering the meridians so that the position of the celestial body is near one of the side edges of the chart where the graduations are large. In numbering the meridians of chart C, it is desirable to choose the numbers so as to make the line connecting the two plotted points pass close to the pivot.

The consecutive numbering of the meridians is possible whenever the GHA of the celestial body and the longitude of the ship are measured in the same direction. Since in the Nautical Almanac, GHA is measured west from Greenwich from 0° to 360°, the value given in the Nautical Almanac may be used without change whenever the latitude of the ship is measured west from Greenwich. When the ship is in a latitude measured east from Greenwich, the simplest method is to measure GHA also east from Greenwich. This requires merely subtracting the GHA figure given in the Nautical Almanac from 360°. The meridians may then be consecutively numbered just as in the case of west longitudes shown in the specific examples. However, it is, of course, possible in the case of east longitudes to number the meridians on the chart in one direction for the plotting of the ship's position and in the other for the plotting of the celestial body's position.

As the meridians must be renumbered for each problem, it is desirable to place the numbers in pencil on the cellulose-acetate sheet 10 or 10' in order that they may easily be erased. To avoid the trouble of numbering the meridians in pencil for each problem, mechanical means for numbering the meridians may be provided. In the case of chart B, such means may consist merely of a circle of numbers from 10 to 360 printed on the transparent sheet 10'. It is then necessary merely to turn the sheet 10' to number the meridians of the plotting half of the sheet as desired before the points are plotted. The simplest means for mechanically numbering the meridians of chart A is to provide a protractor pivoted under the chart at the intersection of the central meridian and the parallel of 36° latitude.

While the simple form of point-marking element shown in Figs. 1, 2, 6 and 7 is satisfactory in practice, other types of pivoted point-marking elements may be used for greater speed or greater accuracy.

Figs. 8a and 8b show a ruler 15 secured to a bar 16 which is slidably mounted on a member 17 mounted on one of the charts A, B or C by means of a pivot 11'. When this device is used, the position of the celestial body and the position of the ship are marked directly on the chart and the ruler 15 is moved until one of its edges passes through both points. A screw 18 is then tightened to fix the bar 16 to the pivoted member 17. An azimuth point is then read at the edge of the ruler. Two marks are made at the edge of the ruler directly over the two plotted points on the chart. For this purpose, the ruler is provided with a strip of transparent markable material 19. After the two points have been marked on the edge of the ruler and the azimuth point has been read and the screw 18 has been tightened, the ruler is swung about the pivot 11' until its marked edge is coincident with a meridian of the chart, and the latitudes of the points marked on the ruler are then read. Very rapid calculations may be made with the device shown in Figs. 8a and 8b if the points are marked on the chart by sticking in pins, then bringing the ruler 15 against the pins and marking the points on the edge of the ruler.

Figs. 9a to 9e show a marking device which lends itself to very quick and very accurate use of the charts. This device includes two planoconvex lens pieces 21, 22 to which are attached transparent flexible strips 23, 24, each of which has two small vacuum cups 25. The lens piece 21 has a dot 26 marked at the middle of its plane surface, and the lens piece 22 has on its plane surface a diametrical line 27 and a dot 28. The lens pieces are connected by a transparent ruler 29 having a black line 30 marked on its bottom. The ruler is pivoted to the lens piece 21 and is slidably connected to the lens piece 22. The pivot connection may consist of an arm 31 on the ruler containing a hole fitting around the lens piece 21 over the strip 23. The sliding connection may consist of a groove 32 in the strip 24 fitting over the top of the ruler. The lens pieces are used with a pivoted member 33 which may consist of a sheet of transparent plastic material like the sheet 10 of Fig. 1 overlying one of the charts and secured to it by a pivot 11₂. The sheet 33 preferably differs from the sheet 10 in having a smooth upper surface, instead of a roughened surface which may be marked with a pencil. This is not essential, as the vacuum cups will adhere to the slightly roughened surface of a markable cellulose acetate sheet.

In using the device shown in Figs. 9a to 9e, the lens piece 21 is moved about over the sheet 33 over the chart until the dot 26 marks the position of the celestial body to be plotted. The ends of the strip 23 are then pressed down, as shown in Fig. 9e, so that the vacuum cups grip the sheet 33 and hold the lens piece in the position in which it has been set. The hole in the arm 31 of the ruler 29 is then placed around the lens piece 21. The strip 24 is placed over the ruler, and the lens piece 22 is moved until the dot on its lower surface marks the dead-reckoning position to be plotted. The ends of the strip 24 are then pressed down to make the vacuum cups adhere to the sheet 33. The ruler is so proportioned that after this has been done the diametrical line 27 on the lens piece 22 is pointed directly toward the dot 26 on the lens piece 21. The latitude and longitude of an azimuth point are then read by looking through the lens piece 22 and selecting any convenient point on the line 27. After this has been done, the sheet 33 with the vacuum cups adhering to it is turned about the pivot 11₂ until the line 30 mark on the ruler 29 is parallel to the meridians of the chart A or the meridians of the measuring half B₂ of the chart B. This brings the mark 26 on the lens piece 21 and the dot 28 on the lens piece 22 on a common meridian of the chart, and the latitudes of the two marks can then be read accurately through the lens pieces. If desired, the two lens pieces and the ruler may be permanently assembled instead of being assembled during the use of the device as described. In either case, the computation may be made very rapidly and accurately.

When great accuracy is not required, the lens pieces 21 and 22 may be replaced by transparent pieces having flat tops and having the same marks on their bottoms as the lens pieces 21 and 22.

Figs. 10a and 10b show a device similar to that shown in Figs. 9a to 9e except that the vacuum cups and pivoted sheet 33 are not used. In the form shown in Figs. 10a and 10b, the lens pieces 21', 22' are pivotably and slidably attached to the ruler 29' as before, but they are not provided with vacuum cups. The lens piece 21' is slidably mounted on a bar 34 which is attached to a chart by a pivot 11₃. A wing nut 35 is provided to lock the bar 34 on the pivot 11₃. One end of the ruler 29' is connected to the bar 34 by a slide rod 36 which passes through a pivot 37 on the bar 34. The pivot is provided with a set screw 38. In using this device with the charts, the wing nut 35 and the set screw 38 are both loosened, the lens 21' is positioned with its mark over the point on the chart where the celestial body is to be plotted, and the wing nut 35 is then tightened to hold it in this position. The lens piece 22' is then set with its dot mark at the dead-reckoning position. The set screw 38 is then tightened, and an azimuth point is read through the lens 22'. The wing nut 35 is then loosened, and the entire apparatus is swung about the pivot 11₃ until the line on the ruler is parallel to the meridians and the marks on the lens pieces are on a common meridian. The required latitudes are then read through the lens pieces.

The devices shown in Figs. 9a to 10b are of a special value in that setting the second lens piece automatically indicates the part of the azimuth line from which the azimuth point is to be read. It is necessary in the specific method which has been described to draw or otherwise indicate at least a part of this line. However, my invention includes also a modified method in which no line need be drawn or indicated. In the modified method, the latitude and longitude of two points on the Sumner line, which I term "Sumner points," are obtained so that the Sumner line may be plotted on the navigation or plotting chart without drawing the azimuth line. In this method, two dead-reckoning positions are assumed, and the offset necessary to place each of these assumed positions on the Sumner line is determined directly from the calculating chart.

To illustrate this method, I will describe the solving of the problem of Example I by it:

*Example V*

See data above table in Example I.

|  | Cel. B. | DR | | Sumner points | | |
|---|---|---|---|---|---|---|
|  |  | A | B | A | B |  |
| GHA | 147° 20' | (170°) | (160°) | 171° 15' | 160° 35' | Long. W. |
| Dec. | −23° 21' | (+25°) | (+20°) | 16° 50' | 21° 10' | Lat. |

|  |  |  |  |
|---|---|---|---|
| ZD₀ | 46°24' | 46°24' | Add |
| C Measured lat. | −48°25' | −39°40' |  |
| Lat. to be plotted | −2° 1' | +6°44' |  |

The solution of this problem is indicated on the right-hand side of Fig. 1. The first step, as before, is to number the meridians. To avoid confusion with Example I on Fig. 1, the meridians are numbered from the right-hand edge of the chart as indicated by the numbers in brackets at the right-hand side of Fig. 1. The position of the celestial body is plotted as before and marked on the transparent sheet 10 at Co. Two dead-reckoning positions are assumed and plotted at S_A and S_B. The transparent sheet 10 is then turned to bring S_B and Co on a common meridian. This places these points in the positions indicated at S'_B and C'_o in Fig. 1. The latitude of the point Co at the position C'_o is then read and entered in the item "C Measured lat." in the table under the heading "B" and added to the observed zenith distance to obtain the latitude to be plotted which, in this case, is 6° 44'. This latitude is then plotted on the common meridian on which the points P_B and Co have been placed in the positions P'_B and C'_o and marked on the sheet 10 at P'_B.

The sheet 10 is then turned a little further to bring the points Co and S_A on a common meridian, placing them in the positions indicated in Fig. 1 at C''_o and S''_A. The latitude of the point Co in this position C''_o is read, entered in the table and added to the observed zenith distance, giving a latitude of −2° 1', which is plotted on the common meridian and marked on the transparent sheet 10 at P''_A. The sheet 10 is then swung back to its original position which places the marked points P''_A and P'_B in the positions indicated at P_A and P_B. These points in this position are points on the Sumner line. Their latitude and longitude are read and entered in the table under "Sumner points." This constitutes a complete solution, as on the navigation or plotting chart it is necessary merely to plot the two Sumner points and connect them by a line in order to obtain the required line of position.

In this method, the two assumed dead-reckoning positions should be selected at opposite sides of a line connecting the position of the celestial body with the actual dead-reckoning position, and the two points should be placed on even degrees to facilitate work. In order to select the two points, it is not necessary to plot the actual dead-reckoning position nor to draw a line from this position to the position of the celestial object, for, after the position of the celestial object has been plotted, it is a simple matter to see where the two assumed dead-reckoning positions should be placed. Since the line of position is not actually a straight line either on a gnomonic projection or on a mercator projection, it is desirable to place the two assumed dead-reckoning positions S_A and S_B only three or four degrees apart. In this example given, they are placed 10° apart merely in order to make their positions plain on the small scale used in Fig. 1. It is unnecessary to place the latitude and longitude of the two assumed dead-reckoning positions in the table. They are placed in parenthesis in the table above merely to facilitate explaining the method.

This modified method may be facilitated without appreciable loss of accuracy by connecting the two Sumner points P_A, P_B by a line on the sheet 10 after the sheet has been returned to its original position, and then reading and transferring to the navigation chart any two points on the line P_A—P_B which fall on even degrees of latitude or even degrees of longitude.

When the modified method is to be used, it is desirable to facilitate returning the sheet 10 to the original position which it had when the points Co, S_A and S_B were plotted by providing a stop, such as a low rule 40, attached along the lower edge of the chart so that it engages the lower edge of the sheet 10 when the sheet is in the position shown in full lines. Since the rule is low, the edge of the sheet may easily be lifted over it when the sheet is to be turned. The modified method which has been described is particularly useful in using large charts, for example, 36 inches square, since with large charts it is somewhat inconvenient to draw or indicate the azimuth line, unless a device of the sort shown in Figs. 9a to 10b is used.

The point-marking devices shown in Figs. 8a, 8b and Figs. 10a, 10b are not appropriate for practicing the modified method, since they include means for indicating the azimuth line. Two lens pieces like the lens piece 21 with the strip 23 and vacuum cups 25 shown in Figs. 9a, 9b and 9e may be used in the modified method without the other parts of the apparatus shown in Figs. 9a to 9e. When this is done, the two Sumner points must be determined separately. One lens piece is positioned to mark the point Co and the other to mark the point S_B. After the sheet to which the lens pieces are attached has been swung to place the two points on a common meridian, the lens piece marking the point S_B is loosened and moved to mark the latitude to be plotted on the common meridian, that is to say, it is moved at the point P'_B. After it has been secured to the sheet in this position, the sheet is swung back to its original position and the latitude and longitude of the Sumner point P_B are then read through the lens piece. This lens piece is then transferred to mark the point S_A and the operation is repeated to obtain the latitude and longitude of the Sumner point P_A.

The degree of accuracy which can be obtained in solving navigation problems in accordance with my invention depends on the size of the charts and the fineness of their graduations.

By using charts eighteen inches square without any magnification, the accuracy is within five miles, which is sufficient for airplane navigation. If the charts are made larger or read through a magnifying glass, there is no difficulty in obtaining an accuracy of one mile, which is substantially as good as that ordinarily obtained by means of tables.

The time required for the solution of navigation problems is greatly reduced by the method. When the simple pivoted transparent sheet shown in Figs. 1 and 2 is used with the charts, navigation problems can be solved in less than three minutes. If a device of the type shown in Figs. 9a to 9e is used, the time may be reduced to less than one minute and a half. The method reduces the time required to learn to solve navigation problems from a matter of weeks to a matter of a few hours. The method can be taught easily and quickly, as it is obvious to a beginner that it is based on the simple principle that the zenith distance of a celestial body is equal to the great-circle distance between the ship and the point on the earth where the celestial body is at the zenith. The fact that the method does not require the use of the local hour angle is a decided advantage for beginners, who are prone to make mistakes of sign in figuring the local hour angle. The apparatus for carrying out the method is far simpler than any mechanical means heretofore suggested for solving navigation problems with equivalent accuracy.

What I claim is:

1. The method of obtaining the great-circle distance between two points of a spherical surface, which comprises plotting the points on a gnomonic projection of the parallels and meridians of a sphere, swinging the points in the plane of the projection about the contact point of the projection without changing the distance between them until they lie on a common meridian of the projection, and then reading the latitude of each point, the algebraic difference between said readings being the required great-circle distance.

2. The method of calculating the zenith distance of a celestial body from a dead-reckoning position, which comprises plotting the position of the celestial body and the dead-reckoning position on a gnomonic projection of the parallels and meridians of a sphere, swinging the plotted points in the plane of the projection about the contact point of the projection without changing the distance between them until they lie on a common meridian of the projection, and then reading the latitude of each point, the algebraic difference between the readings being the required zenith distance.

3. The method of obtaining from a time sight data required to plot a Sumner line of position, which comprises plotting the position of the celestial body and the dead-reckoning position of the ship on a gnomonic projection of the parallels and meridians of a sphere, reading the latitude and longitude of a point near the dead-reckoning position lying on a straight line connecting the dead-reckoning position to the celestial body position to ascertain the direction of the line of position, swinging the plotted points in the plane of the projection about the contact point of the projection without changing the distance between them until they lie on a common meridian of the projection, and then reading the latitude of each point, the algebraic difference between said readings being the calculated zenith distance to be compared with the observed zenith distance to obtain the offset of the Sumner line of position.

4. The method of obtaining from a time sight the position of a point on the Sumner line of position, which comprises plotting the position of the celestial body and an assumed position of the ship on a gnomonic projection of the parallels and meridians of a sphere, swinging the plotted points in the plane of the projection about the contact point of the projection without changing the distance between them until they lie on a common meridian of the projection, then reading the latitude of the plotted celestial-body point, plotting the algebraic sum of this reading and the observed zenith distance as a latitude on said common meridian, swinging this plotted point in the plane of the projection about the contact point of the projection through the same angle through which the first two plotted points were swung but in the opposite direction, which gives this point the position of a point on the Sumner line.

5. The method of obtaining from a time sight data required to plot a Sumner line of position, which comprises plotting the position of the celestial body and two assumed positions of the ship on a gnomonic projection of the parallels and meridians of a sphere, swinging the celestial-body point and one of the assumed position points in the plane of the projection about the contact point of the projection without changing the distance between them until they lie on a common meridian of the projection, then reading the latitude of the celestial-body point and plotting the algebraic sum of this reading and the observed zenith distance as a latitude on said common meridian, swinging this plotted point in the plane of the projection about the contact point of the projection through the same angle through which the celestial-body point was swung but in the opposite direction and then reading the latitude and longitude of this point to ascertain the latitude and longitude of one point of the Sumner line of position, repeating the operation with the second assumed position of the ship to ascertain the latitude and longitude of another point on the Sumner line of position, said two latitudes and longitudes determining the direction and location of the Sumner line.

6. The method of obtaining from a time sight points on a Sumner line of position, which comprises plotting the position of the celestial body on a gnomonic projection of the parallels and meridians of a sphere, swinging the celestial-body point in the plane of the projection about the contact point of the projection until it lies on a meridian of the projection, reading the latitude of the celestial-body point and plotting the algebraic sum of this reading and the observed zenith distance as a latitude on said meridian, swinging the celestial-body point in the plane of the projection about the contact point of the projection until it lies on another meridian of the projection, reading the latitude of the celestial-body point and plotting the alegbraic sum of this reading and the observed zenith distance as a latitude on this meridian, swinging the three plotted points in the plane of the projection about the contact point of the projection without changing the distance between them until the celestial-body point lies at the position in which it was originally plotted, so that the positions in which the other two plotted points are placed on the projection are the positions of two points on the required Sumner line of position.

7. Graphical-computation apparatus for navigation problems and the like, comprising a chart bearing a gnomonic projection of the parallels and meridians of a sphere, and a point-marking element pivoted to said chart at the contact point of the projection, and lying wholly below a plane spaced above the chart by a distance equal to a small fraction of the radius of the projected sphere and having a flat lower surface resting on the upper surface of the chart.

8. Graphical-computation apparatus for navigation problems and the like, comprising two sheets and a pivot securing said sheets together with their inner faces in contact, one sheet bearing a gnomonic projection of the parallels and meridians of a sphere on its inner face and the other sheet being transparent and markable.

9. Graphical-computation apparatus for navigation problems and the like, comprising a chart bearing a gnomonic projection of the parallels and meridians of a sphere, a transparent sheet superposed on said chart and pivoted thereto at the contact point of the projection, a transparent member superposed on said sheet, releasable means for securing said member to said sheet, a second transparent member superposed on said sheet, separate releasable means for securing said second transparent member to said sheet, and a ruler pivotably connected to the first transparent member and slidably connected to the second transparent member, a dot mark on the first transparent member, a dot mark on the second transparent member, and a line mark on the second transparent member intersecting the dot mark on said member and directed towards the dot mark on the first member.

10. Graphical-computation apparatus for navigation problems and the like, comprising a chart bearing a gnomonic projection of the parallels and meridians of a sphere, a transparent sheet superposed on said chart and pivoted thereto at the contact point of the projection, a planoconvex lens having its plane surface on said sheet, releasable means for securing said lens to said sheet, a dot mark on the plane surface of the lens, and a line mark on the plane surface of the lens intersecting the dot mark on said lens.

11. Graphical-computation apparatus for navigation problems and the like, comprising a chart bearing a gnomonic projection of the parallels and meridians of a sphere, a member pivoted to said chart at the contact point of the projection, point-marking members superposed on the chart and slidably connected to said pivoted member, and releasable means for locking said point-marking members to the pivoted member.

12. Graphical-computation apparatus for navigation problems and the like, comprising a chart bearing a gnomonic projection of the parallels and meridians of a sphere, a member pivoted to said chart at the contact point of the projection, point-marking members superposed on the chart and slidably connected to said pivoted member, releasable means for locking said point-marking members to the pivoted member, and automatic means for indicating the position of part of a line connecting the points marked by said marking members.

13. Graphical-computation apparatus for navigation problems and the like, comprising a chart bearing a gnomonic projection of the parallels and meridians of a sphere, a member pivoted to said chart at the contact point of the projection, a point-marking and magnifying member superposed on the chart, and means for locking said member to the pivoted member.

14. Graphical-computation apparatus for navigation problems and the like, comprising a chart bearing a gnomonic projection of the parallels and meridians of a sphere, a member pivoted to said chart at the contact point of the projection, a plano-convex lens having a mark at the center of its flat surface, a second planoconvex lens having a diametrical line and a mark on its flat surface, a connecting member pivoted to the first lens and slidably connected to the second lens in such manner that the diametrical mark on the second lens extends towards the center mark on the first lens, and releasable means for locking said lenses to said pivoted member.

15. Graphical-computation apparatus for navigation and other problems, comprising a chart bearing a gnomonic projection of the parallels and meridians of a sphere with the contact point on the equator, and a point-marking element pivoted to said chart at the contact point of the projection, and lying wholly below a plane spaced above the chart by a distance equal to a small fraction of the radius of the projected sphere, and having a flat lower surface resting on the upper surface of the chart.

16. Graphical-computation apparatus for navigation and other problems, comprising a chart one part of which bears a gnomonic projection of the parallels and meridians of a sphere with the contact point near a pole and an adjacent part of which bears a gnomonic projection of the parallels and meridians of a sphere of the same radius with the contact point at the equator, the contact points of the two projections being coincident on the chart, and a point-marking element superposed on the chart and pivoted to the chart at the common contact point of the two projections.

17. Graphical-computation apparatus for navigation and other problems, comprising a chart one part of which bears a gnomonic projection of the parallels and meridians of a sphere with the contact point near a pole and an adjacent part of which bears a gnomonic projection of the parallels and meridians of a sphere of the same radius with the contact point at the equator, the contact points of the two projections being coincident on the chart.

18. Graphical-computation apparatus for navigation and other problems, comprising a chart one-half of which bears a gnomonic projection of the parallels and meridians of a sphere with the contact point at a pole and extending through 180° of longitude and from a latitude of 30° to a latitude of 90° and the other half of which bears a gnomonic projection of the parallels and meridians of a sphere of the same radius with the contact point at the equator extending through 60° of longitude from the contact point and from a latitude of —60° to a latitude of +60°, the contact points of the two projections being coincident on the chart, and a point-marking element superposed on said chart and pivoted to said chart at the common contact point of the two projections.

19. Graphical-computation apparatus for navigation and other problems, comprising a chart bearing a gnomonic projection of the parallels and meridians of a sphere with the contact point on a parallel at a substantial distance from the pole, and a point-marking element pivoted to said chart at the contact point of the projection, and lying wholly below a plane spaced above the chart by a distance equal to a small fraction of the radius of the projected sphere and having a flat lower surface resting on the upper surface of the chart.

20. Graphical-computation apparatus for navigation problems and the like, comprising a chart bearing a gnomonic projection of the parallels and meridians of a sphere, and a transparent point-marking element superposed on the chart and pivoted to the chart at the contact point of the projection.

21. Graphical-computation apparatus for navigation problems and the like, comprising a chart bearing a gnomonic projection of the parallels and meridians of a sphere, a point-marking element pivoted to said chart at the contact point of the projection, and a releasable connection between the point-marking element and the chart spaced from the contact point of the projection.

22. Graphical-computation apparatus for navigation problems and the like, comprising a chart bearing a gnomonic projection of the parallels and meridians of a sphere, a flexible transparent markable sheet superposed on said chart and pivoted thereto at the contact point of the projection, and a stop secured to the chart and releasably engaged by the sheet.

ROBERT W. BYERLY.